United States Patent [19]

Lestradet

[11] Patent Number: 4,458,775

[45] Date of Patent: Jul. 10, 1984

[54] APPARATUS FOR GUIDING A VEHICLE

[76] Inventor: Maurice C. J. Lestradet, 291 avenue du Maréchal de Lattre de Tassigny, 51230 Fere Champenoise, France

[21] Appl. No.: 354,705

[22] Filed: Mar. 4, 1982

[30] Foreign Application Priority Data

Mar. 6, 1981 [FR] France .................... 81 04550

[51] Int. Cl.$^3$ ................... A01B 69/00; B62D 5/00
[52] U.S. Cl. ............................................. 180/79
[58] Field of Search ............... 180/79, 132, 141, 142; 244/76 R

[56] References Cited

U.S. PATENT DOCUMENTS

| | | | |
|---|---|---|---|
| 2,317,383 | 4/1943 | Hull | 244/76 R |
| 2,662,207 | 12/1953 | Hollister | 244/76 R |
| 2,678,177 | 5/1954 | Chenery et al. | 244/76 R |
| 3,169,598 | 2/1965 | Finn-Kelcey et al. | 180/79 |
| 3,513,931 | 5/1970 | Warner et al. | 180/79 |
| 4,286,151 | 8/1981 | Lestradet | 250/230 |

FOREIGN PATENT DOCUMENTS

| | | | |
|---|---|---|---|
| 2442472 | 6/1980 | France | 180/79 |
| 381188 | 8/1973 | U.S.S.R. | 180/79 |

Primary Examiner—Joseph F. Peters, Jr.
Assistant Examiner—Kenneth R. Rice
Attorney, Agent, or Firm—Fidelman, Wolffe & Waldron

[57] ABSTRACT

The invention relates to apparatus for guiding a vehicle as it moves, of the kind comprising a detector (12) sensing deviation of the heading of the vehicle relative to a pre-determined direction and producing an electrical deviation signal, a hydraulic piston and cylinder device (16) steering the vehicle wheels (2) and control means (15) responsive to the deviation signal.

The technical problem is to provide apparatus of this kind whose operation is progressive and avoids systematic hunting.

In accordance with the invention, the detector produces a deviation signal which is proportional to the deviation of the vehicle heading from the pre-set direction, and the servo-valve provides progressive control as a function of the deviation signal.

13 Claims, 2 Drawing Figures

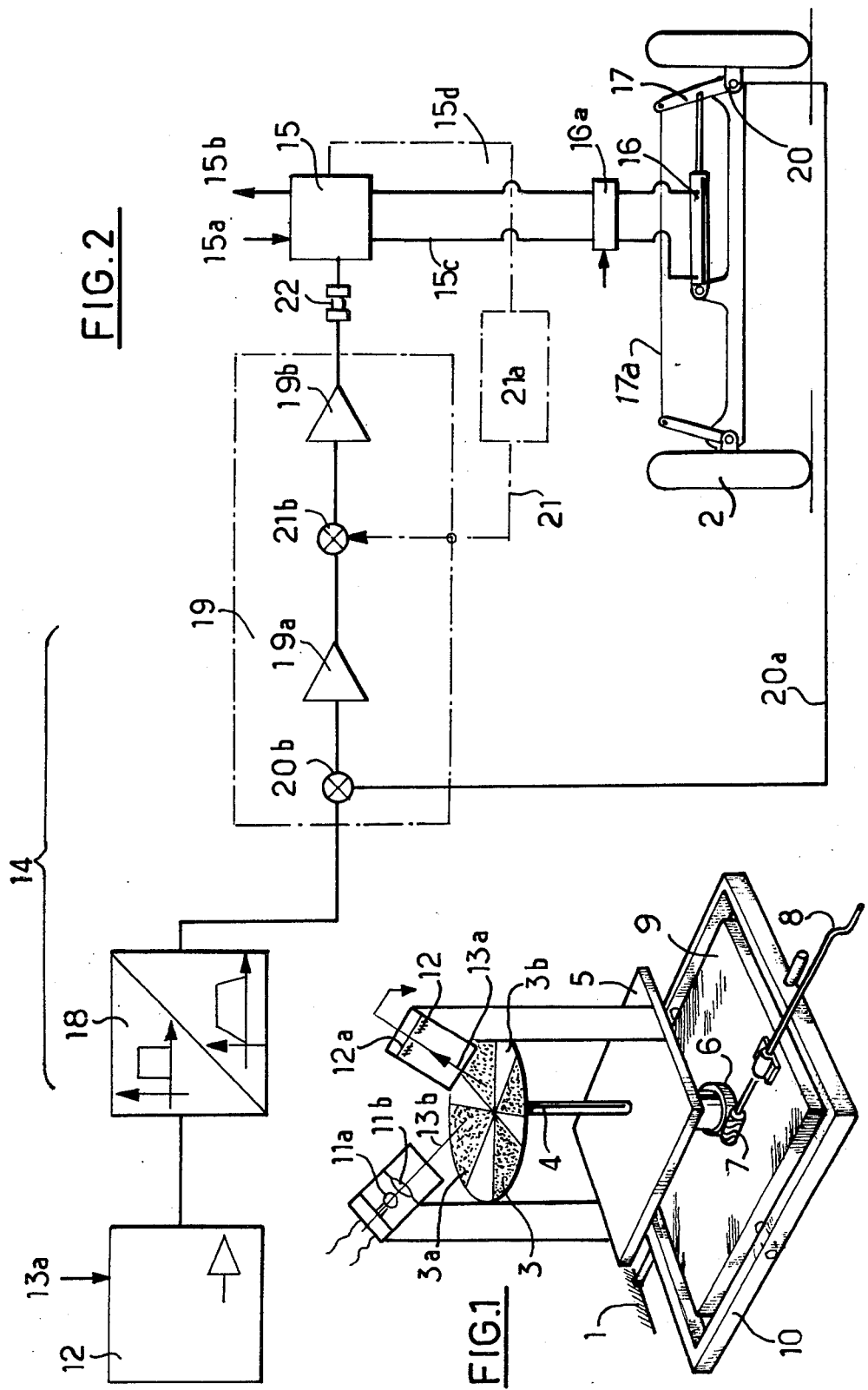

APPARATUS FOR GUIDING A VEHICLE

This invention relates to apparatus for guiding a vehicle as it moves, especially off road vehicles such as agricultural machines, of the kind comprising means for detecting deviation of the heading of the vehicle from a fixed direction, comprising a detector providing an electrical deviation signal, and a control member actuated in response to the deviation signal and controlling means for steering the wheels of the vehicle.

Apparatus of this kind is known, for example from the Applicant's French Pat. No. 2442472, in which the deviation detector comprises two photo-electric cells which receive alternatively a reflected beam produced in the detector means, according as the vehicle deviates to one side or the other of the predetermined direction, while the control means consists of a three position electro-hydraulic switch, operating on a "go/no -go" basis to actuate the jack which steers the wheels.

However, during use of such a device on relatively long paths, which are often bumpy and produce significant yawing or lurching (wheels dropping into a furrow, meeting large stones, driving over flooded ground) the go/no go operation of the control switch under the actuation of one photo-cell or the other leads to systematic hunting of the system and does not bring the vehicle exactly back onto the row or path it had yawed from, so that it finishes up driving parallel to, but spaced from, the path, which can have serious consequences for the work the machine is performing, whether it is working the ground or treating rows of vegetables, for both of which it can be important to keep a perfect alignment with the desired path.

Accordingly, the object of the present invention is to provide apparatus which guides the machine without the same tendency to hunt, and the present invention provides apparatus for guiding a vehicle as it moves comprising detector means responsive to deviation of the heading of the vehicle from a reference direction for producing a deviation signal, steering means for controlling the steering of the vehicle, and control means responsive to said deviation signal for controlling said steering means, characterised in that said detector means has detection characteristics such that said deviation signal is a progressive function of the deviation of the vehicle heading, said steering means and said control means having characteristics which are progressive functions of said deviation signal.

In a preferred embodiment of the invention said steering means comprises hydraulic piston and cylinder means, connected with at least one vehicle wheel and said control means comprises a hydraulic valve for supplying fluid to actuate said piston and cylinder means at a rate which is a progressive function of said deviation signal.

This arrangement and in particular the use of a proportional servo-valve whose flow rate is modulable as a progressive function of the proportional deviation signal, avoiding systematic hunting in operation, improves the track-following while giving excellent flexibility in guidance and rapid and effective steering. The return to alignment is progressive and gives very good heading maintenance, given the rapid response time of the electronic servo generator, and the progressivity also gives very good stability.

Advantageously it may be arranged that said control means includes means responsive to the actuation of said valve for producing a valve actuation signal, and means responsive to the relative values of said deviation signal and said valve actuation signal.

In a preferred embodiment of the invention said detector means comprises magnetic compass means, and heading responsive means responsive to the direction of the vehicle relative to said compass means, and means for adjusting the position of said heading responsive means relative to the vehicle.

In an alternative embodiment of the invention said detector means comprises gyroscopic compass means, heading responsive means responsive to the direction of the vehicle relative to said compass means, and means for adjusting the position of said heading responsive means relative to the vehicle.

Advantageously it may be provided that said compass means comprises a disc presenting at least first and second contrasting zones, said heading responsive means comprising first and second electrically light sensitive elements disposed adjacent each other and differentially responsive to light transmitted from said zones. In this case, it is preferred that the luminance of said first zone varies progressively and symmetrically about an axis of symmetry of said first zone. In a preferred embodiment, moreover, said disc comprises a plurality of each of said first and second zones extending radially over respective angular sectors, whereby to define a plurality of reference directions for possible guidance of the vehicle.

It is preferred also to provide that said control means comprises wheel responsive means responsive to the steering position of at least one wheel for producing a wheel position signal, and means responsive to the relative values of said deviation signal and said wheel position signal. Advantageously, said control means includes integrator means responsive to said deviation signal from said detector means and amplifier means.

Conveniently said control means includes manually actuable means for disabling said control means, whereby to enable manual steering of the vehicle.

Other features and advantages of the invention will appear from the following description, given by way of non limitative example, with reference to the accompanying drawings, in which:

FIG. 1 is a diagrammatic perspective view of the deviation detector means of apparatus according to an embodiment of the invention.

FIG. 2 is another schematic diagram showing additional elements in the apparatus, including a servo valve and servo drive system.

The guiding apparatus shown is fitted to a vehicle, such as an agricultural machine, comprising a chassis I and steered wheels 2.

As shown in FIG. 1 the means for detecting directional deviation of the vehicle comprises a rotating magnet member in a floating mount, comprising a disc or compass rose 3 disposed horizontally and mounted for movement on the end of a support needle 4 which is fixed on a horizontal support plate 5. The plate 5 is mounted for rotational movement, by means of a gearing 6 which can be rotated through an endless screw 7 by a control wheel 8, on an intermediate plate 9, which is fixed directionally relative to the chassis 1 of the vehicle through a gimbals system 10 which enables the support 5 and the disc 3 to be maintained horizontal.

The disc 3 has a generally light-absorbing black background 3a, on which are disposed at 90° one to the other, four zones in the shape of angular sectors 3b presenting a limited aperture of approximately ± 10°, the zones being reflecting surfaces the reflectance diminishing progressively away from the axis of each zone, the reduction in reflectance being obtained, for example, by non reflective stripes which are progressively closer.

On the support 5, there is also mounted an optical system, permanently fixed to the support, and comprising, disposed in the same (preferably vertical) plane through the axis 4 of the disc, on one hand an emitter comprising a source of light 11a and condenser 11b, and on the other hand a receiver block comprising two photo-resistors 12 disposed adjacent each other on opposite sides of the common plane in a surface 12a which is perpendicular to the reflected light beam 13a which may be produced by the incident beam 13b emitted by the block 11a, 11b when one of the reflective zones 3b appears in the common plane of the apparatus.

Whatever the direction in which the vehicle is facing at the beginning of a rectilinear path which the vehicle is to follow, the driver actuates the control wheel 8 so as to displace the support 5 until the common plane of the optical system 13a, 13b is brought to intersect precisely the axis of symmetry of one of the zones 3b of the disc (it being understood that the disc and the zones thereon maintain a permanent direction in space because of the magnetisation of this member).

Thus, it will be apparent that as the vehicle moves along the predetermined path, a deviation of the vehicle relative to its desired heading will produce a corresponding rotation of the support 5 about the disc 3. Accordingly, whereas in the normal aligned position the reflected beam 13a illuminates the two photo-resistances 12 equally, so that they supply electrical currents of the same magnitude, when a deviation occurs the plane of the optical system deviates to one side or another in the zone 3b and, because of the differential reflection which results, the magnitude of the currents supplied by one of the photo-resistances increases while the other decreases. Data is thus obtained not only indicating a directional deviation, but relating to its magnitude and especially its sense (positive or negative), since the variation in current in the two photo-resistances for deviations in opposite senses are inverted.

As shown in FIG. 2, the photo-resistances 12, which form the output of the deviation detector means and which produce an analogue electrical signal proportional to the directional deviation detected, are connected through a servo control generator 14 to a servo valve 15.

The four connectors of this servo valve are connected, on one hand to the inlet and return pipes 15a, 15b from a hydraulic pump and supply (not shown), and on the other hand through pipes 15c and 15d to the two control chambers of a steering jack 16 (piston and cylinder device). The cylinder of the steering jack is connected to the chassis, while the piston rod is connected to one of the two steering arms 17 which are solid with the stub axles of wheels 2, and which are connected together by a track rod 17a. A distributor and cut-off switch 16a is interposed in the pipes 15c and 15d, the switch being connected to a control situated in the vehicle cab, so as to enable the vehicle steering to be placed under manual control if the driver wishes, and as necessary.

The servo control generator 14 comprises, connected in series between the detector photo-resistances 12 and the servo-valve 15, an integrator/slope generator stage 18 and a servo amplifier 19. The servo amplifier 19 comprises, also in series, an input amplifier stage 19a, then a power amplifier 19b (comprising two transistors PNP and NPN). In addition, a coder 20 is mounted on the pivot of one of the steered wheels 2, the coder 20 comprising for example a potentiometer winding and cursor, or a toothed wheel and counter, which responds to the direction of the wheels relative to the straight ahead position. This coder 20 is connected by a feedback loop 20a to the input of the first stage amplifier 19a. Another feed-back loop 21 is provided, comprising a delay circuit 21a, between the servo-valve 15 and the input 21b of the second stage amplifier 19b.

In operation, the first stage 18 processes the data supplied by the detector 12, while the servo-amplifier comprises a complete direct current amplifier integrated into a servo feedback loop, so as to supply current to the windings of the servo valve proportional to the algebraic sum of the control and feedback voltages. The input stage 19a gives integral or proportional control, while the second stage 19b introduces the derivative of the signal applied to the input. Lastly the delay circuit 21a, which is controllable, enables the correction to be delayed relative to the detected error so as to obtain better operational stability of the system.

The servo control generator is in practice made in the form of three electronic circuits cards corresponding to the dignal processing stage 18, the servo amplifier 19 and the delay circuit 21a.

These different units are disposed in a housing, which is disposed in the vehicle cab, for example. The housing may be connected to the servo-valve input through a plug and socket connector 22, as shown.

The operation of the apparatus described above will be almost apparent already from the above description. Once the tractor or other vehicle has been brought to the start of the desired path and turned to face down it, the support 5 for the disc 3 is moved by the control wheel 8 until the vertical plane of the incident and reflected light beams 13b and 13a is positioned on the axis of symmetry of one of the reflective zones 3b on the disc. In this position, the two photo-resistances 12 are equally illuminated so that the whole circuit is perfectly balanced and the servo-valve maintains the jack 16 in a mid position corresponding to the straight-ahead position of the wheels 2.

If the tractors yaws from the desired path as it goes, to one side or the other of the chosen heading, the movement of the chassis displaces the support 5 and the optical system in the same sense. One of the photo-resistances increases in magnitude, while the other decreases. This double data processed in the circuit 14, controls the servo-valve 15 and hence the jack 16 to steer the wheels in a direction which brings the vehicle back towards the desired path. This action, due to the characteristics of the control system is perfectly progressive and ensures a return to the initial path, while giving stable operation of the system.

I claim:

1. In an apparatus for guiding a land vehicle as it moves along a nominally straight path, said apparatus comprising detector means for producing a deviation signal in response to deviation of a heading of said vehicle from a reference direction, said detector means comprising compass means for providing said reference direction, heading responsive means for responding to a change of said heading relative to said reference direction, and adjustment means for adjusting said heading responsive means relative to said vehicle and setting said heading steering means for controlling steering of said vehicle; and control means for controlling said steering means in response to said deviation signal; the improvement comprising:

said detector means further comprising means for providing said deviation signal as a progressive function of said heading deviation from said reference direction; and said steering means and said control means comprising means for providing progressive functions of said deviation signal, steering said vehicle back toward said path, and correcting said heading deviation of said vehicle.

2. The improvement as in claim 1 wherein said steering means further comprises an hydraulic piston and cylinder connected with at least one vehicle wheel and said control means comprises a hydraulic valve means for supplying fluid to actuate said piston and cylinder at a rate which is progressive function of said deviation signal.

3. The improvement as in claim 1 wherein said control means further comprises means responsive to the actuation of said valve for producing a valve actuation signal, and means for responding to the relative values of said deviation signal and said valve actuation signal.

4. The improvement as in claim 1 wherein said compass means comprises a disc presenting at least first and second contrasting zones, said heading responsive means comprising first and second electrically light sensitive elements disposed adjacent each other and differentially responsive to light transmitted from said zones.

5. The improvement as in claim 4 wherein a luminance of said first zone varies progressively and symmetrically about an axis of symmetry of said first zone.

6. The improvement as in claim 5 wherein said disc further comprises a plurality of each of said first and second zones extending radially over respective angular sectors, so as to define a plurality of reference directions for possible guidance of the vehicle.

7. The improvement as in claim 1 wherein said control means further comprises wheel responsive means responsive to the steering position of at least one wheel for producing a wheel position signal, and means for responding to the relative values of said deviation signal and said wheel position signal.

8. The improvement as in claim 1, wherein said compass means comprises a magnetic compass.

9. The improvement as in claim 1, wherein said compass means comprises a gyroscopic compass.

10. The improvement as in claim 1, wherein said control means further comprises integration means responsive to a time integral of said deviation signal, for providing a characteristic which is a progressive time integral function of said deviation signal.

11. The improvement as in claim 1 or 10 wherein said control means further comprises means for providing a controlled time lag response.

12. The improvement as in claim 11 wherein said control means further comprises a feedback loop comprising a delay circuit.

13. The improvement as in claim 1 wherein said control means further comprises manually actuatable means for disabling said control means and enabling manual steering of the vehicle.

* * * * *